June 10, 1924.

B. HIRSCHHORN 1,497,175

TEA CARTRIDGE

Filed Oct. 26, 1923

INVENTOR
B. Hirschhorn
BY
Sigmund Herzog
ATTORNEY

Patented June 10, 1924.

1,497,175

UNITED STATES PATENT OFFICE.

BENJAMIN HIRSCHHORN, OF NEW YORK, N. Y., ASSIGNOR TO MILLIE PATENT HOLDING CO. INC., OF NEW YORK, N. Y., A CORPORATION OF NEW YORK.

TEA CARTRIDGE.

Application filed October 26, 1923. Serial No. 670,858.

*To all whom it may concern:*

Be it known that I, BENJAMIN HIRSCHHORN, a citizen of the United States, and resident of the city of New York, in the county of Bronx and State of New York, have invented certain new and useful Improvements in Tea Cartridges, of which the following is a specification.

The present invention relates to cartridges for percolating or extracting the flavor from tea leaves or coffee, and has for its main object to provide a cartridge in the form of a bag, the mouth of which is closed by a staple or clip, which serves at the same time to attach to the bag a suspending string.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

Two of the many possible embodiment of the invention are illustrated in the accompanying drawings, in which:—

Figure 1:
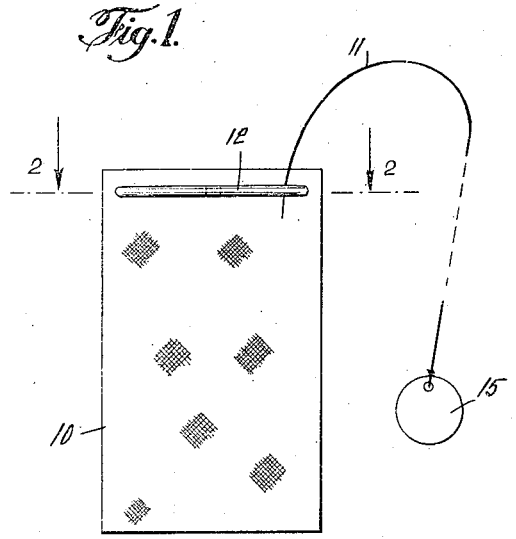
Figure 3:
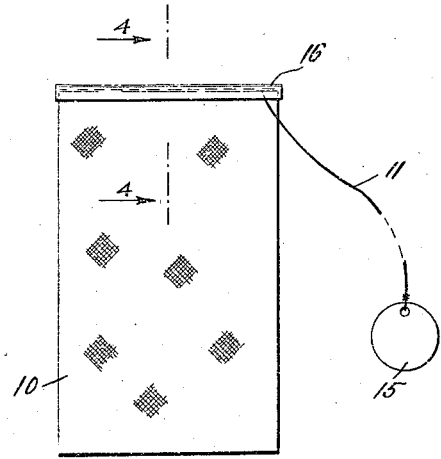
Figure 2:
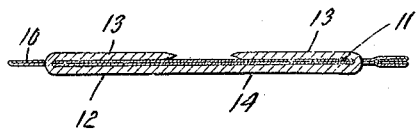

Figure 1 is an elevation of a tea cartridge constructed in accordance with the present invention; Fig. 2 is a section taken on line 2—2 of Fig. 1, on a larger scale; Fig. 3 is an elevation similar to the one shown in Fig. 1 of a modification of the invention; and Fig. 4 is a section taken on line 4—4 of Fig. 3, on a larger scale.

Referring now first to Figs. 1 and 2 of the drawings, the numeral 10 indicates a bag of open-mesh textile fabric, such as for instance cotton, it being made in any suitable manner. In preparing the tea cartridge, tea leaves or coffee for a single brewing are placed into the said bag, and one end of a suspending string 11 placed against the mouth portion thereof. A staple 12, preferably U-shaped, is then applied to the said mouth portion, the prongs 13 of the said staple being forced through the two plies of the bag, said prongs being then bent against one of the said plies, as shown in Fig. 2 of the drawings, the web portion 14 of the staple abutting against the other one of said plies. The width of the body portion of the staple is somewhat less than the width of the bag, as clearly shown in Figs. 1 and 2 of the drawings, whereby the mouth of the said bag is effectively closed, the suspending string being securely held in place upon the cartridge by the staple. To the outer, free end of the suspending string is attached a handle 15 of pasteboard or like material, for a purpose hereinafter to be described.

In brewing tea or coffee with the improved device, the cartridge is taken hold of by its handle 15 and lowered into the brewing receptacle, the free end of the string and handle being permitted to hang over the mouth of the receptacle, after which its cover is put in place. The cover thus holds the free end of the string and handle ready for further operation. Into the receptacle is poured, either before or after the insertion of the cartridge, a suitable quantity of boiling water. When sufficient essence has been extracted from the tea leaves or coffee within the cartridge, the cover of the brewing receptacle is removed and the bag withdrawn by grasping its handle.

Figure 4:
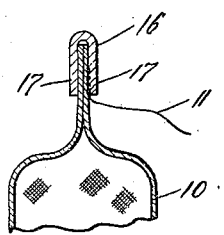

The modification illustrated in Figs. 3 and 4 of the drawings differs from the one above described in that, instead of the staple 12, a metal strip 16 is employed, said strip being of U-shaped cross-section, as clearly shown in Fig. 4 of the drawings. In preparing this cartridge, one end of the suspending string 11 is placed against one of the plies of the bag at the mouth portion of the latter, and the strip 16 caused to embrace the mouth of the bag, it being held in position upon the bag by pressing the leg portions 17 of the closure strip toward one another into gripping positions.

What I claim is:—

A device for extracting essence from tea leaves or coffee, comprising a bag of textile fabric having a flat mouth, a suspending string placed against said mouth, and a metal sealing device of a width substantially of that of said bag in engagement with the mouth portion of said bag, said sealing device attaching said string to said bag.

Signed at New York, in the county of New York, and State of New York, this 16th day of October, A. D. 1923.

BENJAMIN HIRSCHHORN.